United States Patent [19]

Losee et al.

[11] Patent Number: 4,975,794

[45] Date of Patent: Dec. 4, 1990

[54] BERNOULLI EFFECT TRANSDUCER COUPLER

[75] Inventors: Paul D. Losee, Layton; Michael R. Lyon, Roy; Matthew W. Pettit, Morgan, all of Utah

[73] Assignee: Iomega Corporation, Roy, Utah

[21] Appl. No.: 328,630

[22] Filed: Mar. 27, 1989

[51] Int. Cl.$^5$ .......................... G11B 5/48; G11B 21/21
[52] U.S. Cl. .................................... 360/104; 360/103; 360/122
[58] Field of Search ............... 360/104, 102, 103, 122, 360/129

[56] References Cited

U.S. PATENT DOCUMENTS

4,414,592 11/1983 Losee et al. .......................... 360/122
4,605,977 8/1986 Matthews ............................. 360/102
4,833,556 5/1989 Kosarko et al. ..................... 360/102

Primary Examiner—David J. Severin
Attorney, Agent, or Firm—Woodcock Washburn Kurtz Mackiewicz & Norris

[57] ABSTRACT

A magnetic head assembly having a flat surface for disposition adjacent to a recording medium and a protrusion in the range of about 1 to about 20 micro-inches on the flat surface effects coupling of the head assembly to the recording medium and creates a constant contact zone, surrounding the read/write gap of the head assembly, between the head assembly and the record medium. The preferred range for the protrusion is about 6 to about 8 micro-inches and the area of the flat surface is preferably in the range of about 3 to about 4 square millimeters.

18 Claims, 3 Drawing Sheets

_Fig. 5_

_Fig. 6_

BERNOULLI EFFECT TRANSDUCER COUPLER

BACKGROUND OF THE INVENTION

The present invention relates to magnetic recording systems. More particularly, the invention relates to magnetic head assemblies for use in such magnetic recording systems.

Magnetic recording systems wherein rigid magnetic recording media or magnetic disks are rotated adjacent to so-called "Winchester" type magnetic read/write heads which "fly" on an air bearing in very close proximity to the rigid magnetic disk are well known. Such systems are hereinafter sometimes referred to as "rigid disk systems". These rigid disk systems utilize noncontact magnetic retrieval and recording of data (i.e., read/write operation) and operate at very high speeds, typically at approximately 3600 rpm, which results in very high performance. The magnetic heads used in rigid disk systems are relatively inexpensive and have a relatively low mass, typically about 65 mg, as compared to heads utilized in other types of recording systems. Such low mass heads result in high efficiency in track to track access time and seek performance.

It might be explained here that the overall capacity or aerial density of magnetic data storage devices, in bits/sq. in., is equal to combination of track density (tracks/in.) and linear bit density (bits/in.). While rigid disk systems have high performance and exhibit relatively high track density, they exhibit less linear bit density than is possible with contact recording devices. Another disadvantage of rigid disk systems is so-called "head crashes", i.e., the head moving from its flying position over the record media into contact with the record media. Such head crashes can cause a loss of data because of damage to the record media and extensive down time because many times when a head crash occurs, damage is caused to the head/disk assembly (HDA) in the disk drive itself which must be repaired before the recording system can properly function again.

Magnetic recording systems which read and write data from flexible magnetic recording media have also been developed. In general, flexible recording media are less expensive than rigid recording media. Basically, such magnetic recording systems which utilize flexible recording media are of two types. In a first or conventional type of recording system, so called "floppy" disks and "floppy disk drives" are utilized. Floppy disk drives have been extensively used for small so-called microcomputer systems, for word-processing applications and the like. In these floppy disk systems, the floppy disk drive clamps the flexible disk onto a motor shaft which rotates the disk. The rotating disk, in turn, is contacted by a magnetic read/write head or two opposed magnetic read/write heads with the disk being sandwiched between the two heads. In order to assure contact between the magnetic head and the floppy disk and further, to assure proper read/write operation, heavy loading (approximately 10 grams) of the head or heads against the floppy disk or the use of pressure pads is required. Such heavy loading and the use of pressure pads requires low speed operation, typically about 1,000 rpm or less. Due to the "loaded contact" conditions of the floppy head/disk interface, the expected media life during single track dwell is approximately only 168 hours.

In theory, floppy disk systems can provide high linear density recording because the head is in contact with the media. This advantage is seldom utilized in practice because the slow rotational speed of the floppy drive precludes high performance, i.e. fast seek and track/track access times. Therefore the floppy drive has found a nitch market as a low performance, low capacity, and low cost drive. It is noteworthy that the floppy head is usually the expensive component of the floppy drive. The floppy head is more expensive than a rigid head due to its increased mass (approximately 150mg), multiple read/write and erase gaps, and multiple coil windings.

In a second type of recording system which uses flexible magnetic recording media, a floppy or flexible disk is rotated in close proximity to a flat rigid "Bernoulli" plate or surface. Such systems are hereinafter sometimes referred to as "Bernoulli systems". As is understood to those skilled in the art, the thin layer of air between the flexible disk and the Bernoulli plate or surface tends to rotate with the flexible disk and to be thrown outwardly by centrifugal force. This creates a negative pressure between the Bernoulli plate and the flexible disk which tends to pull the disk close to the plate and cause the disk to "fly" or become "stabilized" as these terms are used in the art, in a predictable planar relationship with respect to the Bernoulli surface. Essentially, an air bearing is created between the flexible magnetic disk and the rigid Bernoulli surface such that a constant and predictable spacing between the Bernoulli surface and the flexible magnetic disk is established. Once the flexible magnetic disk is stabilized, the magnetic head/coupler assembly utilized in these Bernoulli systems can be "coupled", as this term is used in the art, to the flexible magnetic disk. A magnetic head/coupler assembly which is coupled to the flexible disk will penetrate or dimple the flexible disk, i.e., the flexible recording media will substantially conform to or be shaped substantially to that of the magnetic head/coupler surface in the area of the record media which is located directly over the magnetic head/coupler. This dimpling phenomenon occurs directly over the magnetic head/coupler assembly and when effected, the flexible media "flies" with respect to the coupler and all points of the magnetic head/coupler assembly except for the area on the magnetic head called the "bearing". The bearing is centered over the read/write gap of the transducer or core and coil assembly of the magnetic head and contact between the flexible media and the magnetic head occurs in the bearing area.

In Bernoulli systems, the flexible magnetic media is rotated at a relatively high speed, typically about 2,000 rpm, and this results in high performance for such systems, i.e., higher performance than in floppy systems but lower than that of rigid disk systems. The cost of the magnetic head/coupler assembly utilized in Bernoulli system is relatively high as compared to the magnetic heads used in the rigid and the conventional floppy disk systems, i.e., they are more expensive than the heads utilized in these systems. The magnetic head/coupler assembly of Bernoulli systems has a very high mass, typically about 1300 mg. Therefore, to achieve respectable track to track access time, significantly greater power and actuator mass is required. With regard to aerial density or capacity, the Bernoulli systems have high linear bit density because they are contact type recording systems and they also use track following servos to achieve high track density. This results in high aerial density. Therefore Bernoulli systems can achieve equivalent or higher capacity than that of rigid disk systems and higher than the capacity achieved in practice by the conventional floppy systems which are also contact type recording systems. In Bernoulli systems, head crashes that cause loss of data and possible damage to the drive of the system are protected against because the record media generally flies beneath the head and would fall away from the head with any disruption. Consequently, Bernoulli systems are more rugged than rigid disk systems.

With the foregoing as background, it can be seen that it would be desirable to have a magnetic recording system with the advantages of the rigid systems, i.e., high performance, high track density, low cost recording heads, and low mass recording heads with attendant high track to track access time, as well as the advantages of the flexible systems, i.e., relatively inexpensive recording media and ruggedness as well as the relatively high linear bit density, along with high capacity of the Bernoulli systems.

BRIEF SUMMARY OF THE INVENTION

The present invention provides a magnetic head assembly for use in magnetic recording systems in response to, and in satisfaction of, the aforementioned desire. The magnetic head assembly in accordance with the invention comprises a transducer and a body member having a surface for disposition adjacent to a recording medium. The transducer is supported by the body member and has a portion thereof protruding from the surface of the body member from about 1 to about 20 micro-inches.

The magnetic head in accordance with the invention has a very low mass, approximately 12 mg, as compared to magnetic heads utilized in conventional floppy systems which are typically about 160 mg; to magnetic heads utilized in rigid disk systems which are typically about 65 mg; and, to magnetic head/coupler assemblies utilized in currently available Bernoulli systems which are typically about 1300 mg. The very low mass of the magnetic head in accordance with the invention permits light loading at the head disk interface which results in less drag than in other currently available contact recording systems. Because of such light loading with its attendant lesser drag, the recording medium can be rotated at higher speeds, approximately 2,800 rpm, which results in higher performance than previously available in either conventional floppy recording systems or in currently available Bernoulli systems. The low mass of the magnetic head assembly in accordance with the invention also results in high track to track access time because the low mass of the magnetic head assembly can be moved from track to track more quickly by the actuator of the disk drive of the recording system. Because the mass of the magnetic head assembly of the invention is approximately one-fifth that of Winchester type heads utilized in rigid disk systems, track to track access time in a recording system using the magnetic head assembly of the invention can exceed that of such rigid disk systems for a given actuator power. The advantages and attributes of the magnetic head assembly of the invention are achieved while keeping the costs of the magnetic head assembly to a minimum. As for example, the costs of a magnetic head assembly of the present invention are about equal to or less than Winchester type heads which are currently the least expensive type of head; about 50% less than the cost of conventional floppy type heads; and, are 3 to 4 times lower than conventional Bernoulli type head/coupler assemblies.

The foregoing advantages of the invention together with a number of other favorable attributes thereof will become more apparent upon consideration of the ensuing specification, particularly when considered in light of the appended drawings, directed toward particular embodiments of the invention but also illustrative of the underlying concepts thereof.

DESCRIPTION OF THE PREFERRED EMBODIMENTS

Figure 1:
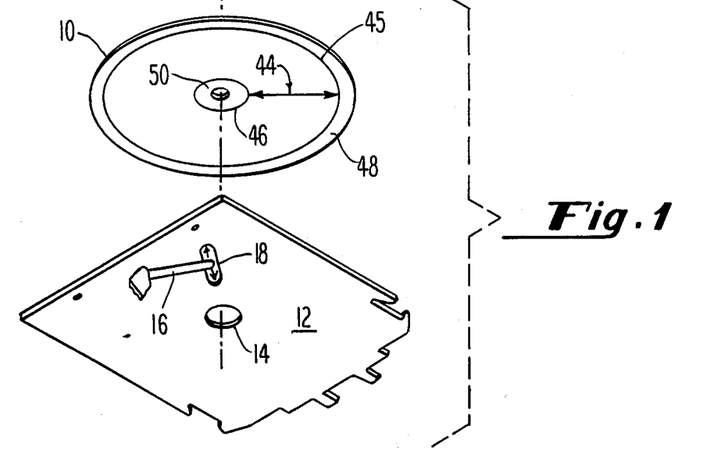
FIG. 1 is a diagrammatic illustration of a magnetic disk, Bernoulli plate and actuator of a disk drive to which the magnetic head assembly of the invention is particularly applicable.

Referring now to FIG. 1, the magnetic head assembly of the present invention, while not limited thereto, is particularly applicable to magnetic disk drives in which a recording medium or a flexible magnetic circular disk 10 is rotated against a flat Bernoulli plate 12. The magnetic disk 10 is engaged by a drive motor (not shown) which extends through the hole 14 in the Bernoulli plate 12 to engage the disk 10. In the diagrammatic illustration of FIG. 1, the magnetic head assembly of the invention is carried by the actuator arm 16 which travels in an arcuate path across the magnetic disk 20. The magnetic head assembly of the present invention extends through the arcuate hole 18 in the Bernoulli plate 12 into read/write engagement with the flexible magnetic disk 10.

Figure 2:
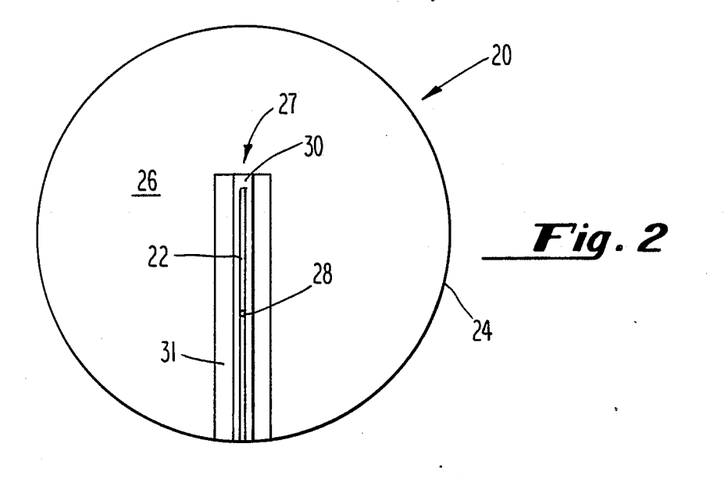
FIG. 2 is a enlarged diagrammatic plan view of the magnetic head assembly in accordance with the invention.
Figure 3:
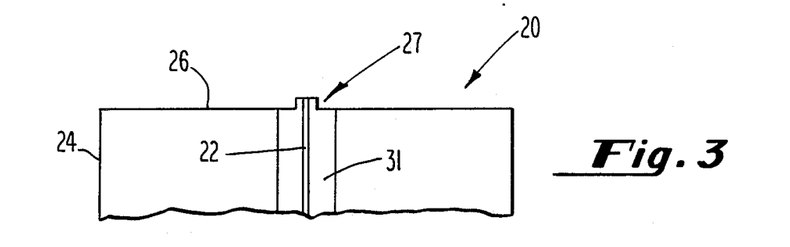
FIG. 3 is a side view of FIG. 2.

Referring now to FIGS. 2 and 3, the magnetic head assembly of the present invention, is shown generally at 20, and includes a transducer element 22 and a body member 24. Body member 24 includes a flat or substantially flat surface 26 for disposition adjacent to a recording medium, as for example magnetic disk 10, as will be explained more fully hereinafter. The surface 26 is described as flat or substantially flat because it may be desirable to provide a slight radius of curvature to surface 26 for hydrodynamic reasons to adjust the airflow over the surface 26 under various operating conditions. The transducer element 22 is supported by the body member 24 and, as can best be seen in FIG. 3, has a portion thereof, shown generally at 27, protruding from the surface 26. The transducer element 20 has a magnetic gap 28.

It has been determined that for standard so-called 3 mil flexible record media that to effect coupling between the magnetic head assembly of the invention and the recording media the flat surface 26 should have an area in the range of about 3 to about 4 square millimeters, which is the preferred range. Optimum performance has been achieved with such 3 mil record media with flat surface areas in such range. Magnetic head assemblies, in accordance with the invention, have been fabricated using 2 millimeter diameter surfaces or a surface area of 3.14 square millimeters.

The illustrated geometric shape for the flat surface 26 is circular as depicted in FIGS. 2 and 3, however, other geometric shapes such, as for example, rectangular, square, elliptical and oval, have been determined to provide acceptable head/disk coupling results. It should be noted that flat surface areas outside the preferred range (i.e., about 3 to about 4 square millimeters) can provide acceptable coupling results when properly balanced with other head, media and drive parameters, such as head orifice, protrusion height, length, width, media stiffness, disk rotational speed, operating radius, etc. as will be understood to those skilled in the art.

The protruding portion 27 of transducer element 22 can be seen in FIGS. 2 and 3 to be a part of a larger protrusion from the surface 26 comprised of a rectangular region 30 substantially surrounding and providing structural support to the protruding portion 27 of transducer element 22. This configuration or feature is the preferred one for a magnetic head assembly having a single transducer element as a part thereof. However, other protrusion shapes such as square, oval, round, etc. can be designed to achieve equivalent desirable results. As shown in FIG. 2, the transducer 22 and associated region 30 is centered and located to the leading edge of the flat surface 26 for ease of manufacture as will appear hereinafter. It should be noted, however, that different and other configurations for both the transducer 22 and its location on the surface 26 are possible and, in fact, have been tested by applicants and found to provide acceptable performance. The region 30 is an integral part of glassing window 31 which locates and secures transducer element 22 to body member 24 as will be further explained hereinafter.

Figure 2A:
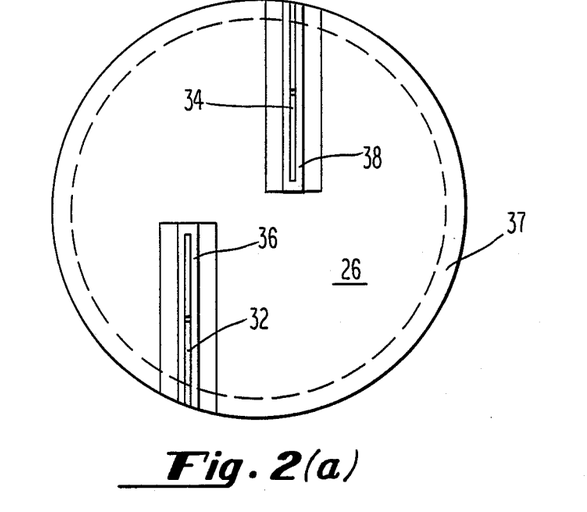
FIG. 2(a) is an enlarged diagrammatic plan view illustrating various features and alternatives in accordance with the concepts of the invention.

Referring now to FIG. 2(a), the flat surface 26 is shown to have multiple transducer elements 3 and 34 and multiple rectangular regions 36 and 38 substantially surrounding the protruding portions of the transducer elements 32 and 34. Such multiple features permit read/write operation from both transducer elements. Of course, other arrangements and placement of the transducer elements in any desired location are possible and within the spirit and scope of the present invention. All that is required is that the transducer element or elements have a portion thereof protrude from the flat surface 26. Also/ depicted in FIG. 2(a) is a circumferential orifice surface 37 which may be provided on the magnetic head assembly if so desired. The orifice surface 37 is beveled away from the plane of surface 26 and forms a hydrodynamic orifice which controls the airflow over the flat surface 26 in a manner known to those skilled in the art.

Critical to the operation of the magnetic head assembly, in accordance with the invention, is the height of the protrusion. It has been determined that protrusion heights may be in the range of about 1 to about 20 micro-inches depending on operating environment and transducer element requirements, such as for example, flat surface area of head, and all the aforementioned parameters. The preferred protrusion height is in the range of about 6 to about 8 micro-inches. It has been determined that with protrusion heights above about 20 micro-inches no coupling will occur between the head and the recording media and with protrusion heights below about 1 micro-inch that gap contact will be intermittent and mobile.

In order to test and to determine behavioral characteristics of the magnetic head assembly of the invention, Applicants have used clear glass heads and microscopic examination techniques, along with read/write signals from live heads, and sensitive electro-mechanical load cells.

Such testing has resulted in the following theoretical conclusions concerning the relationships governing the operation of the invention.

The bernoulli equations show that when a stationary and moving object are placed in close proximity to each other, a negative pressure is generated in the gap between the objects which has the effect of drawing the objects toward one another. In the case of a Head/Disk Interface, the stationary object is the Read/Write head and the movable object is the rotating disk surface. If sliding contact is not desired as these objects come together, an orifice is created on the read/write head which creates "lift" to counterbalance the bernoulli attractive forces. This is the balance achieved in the rigid disk environment.

However, if contact is desired, the flat head surface can be designed in such a way to allow mating of the head/disk surface and the result is an intermittent contact condition between the two surfaces. In order to achieve constant contact conditions to insure stable read/write conditions, typical floppy disk heads are loaded into the media at approximately 10 grams of normal load. This requirement of high head loading to achieve stable contact conditions on flexible media results in high head/disk wear and inability to rotate the disk high speeds.

The invention provides a way to convert a small zone on the head surface to a condition of constant contact, wherein the read/write gap is placed, thereby achieving the benefits of contact recording without the problems of wear and rotational speed constraints inherent in the typical floppy head/disk interface. Using extremely sensitive load cells, the normal loading required for a stable contact condition over the read/write gap of the magnetic head assembly of the invention has been measured at about 100 to about 300 milligrams (about 0.1 to about 0.3 grams). Also, using white light interferometry techniques of fly height measurement, it has been verified that the zone of protrusion on the head surface is solidly in contact, while the surrounding flat surface of the head is between 0 to about 5 micro-inches spacing with respect to the media surface (i.e., intermittent contact).

The basic concept of the invention then, is to allow the head to couple to the media using aerodynamic bernoulli forces of attraction, and then providing a slight protrusion on the head surface to create a constant contact zone surrounding the read/write gap to achieve stable contact recording conditions. The Applicants have furthermore found that the head surface area plays a critical role in the initial bernoulli coupling of the head and media. This surface area must be large enough to generate the negative pressure attraction forces, but small enough to interface with only a small area of the flexible media at any given moment. As flexible media interface area increases, so does instability and axial displacement of this area of media. At approximately about 4 square millimeters media surface area, media instability increases at a higher rate than bernoulli coupling stability of the corresponding head surface area. The result is a decrease in overall head/-disk stability.

An added benefit of head surface areas less than about 4 square millimeters is the corresponding low mass of the head. Benefits of the low head mass are: (1) less actuator power required to move the heads from track/track, (2) lower cost actuators, (3) increased dynamic response of the head/flexure system to follow the axial displacements of the media, and (4) lower costs in manufacture of the head.

Figure 4:
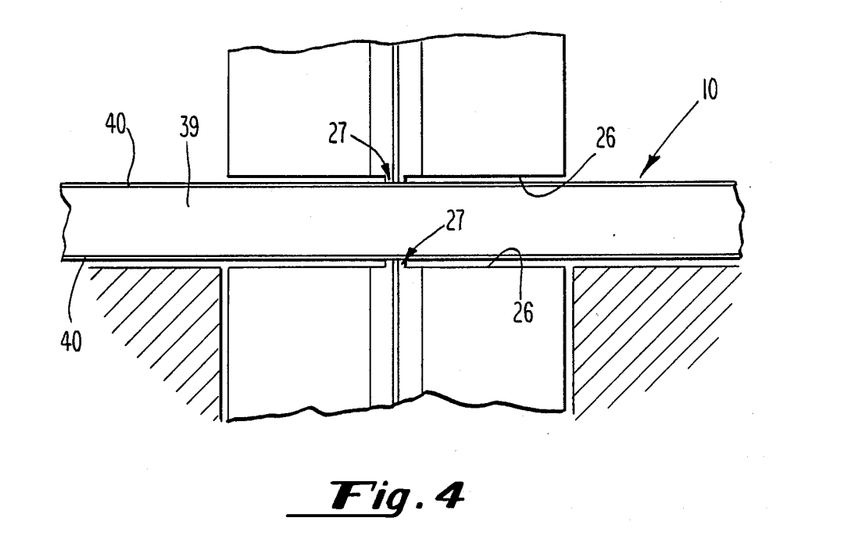
FIG. 4 is an enlarged diagrammatic cross-sectional view of the head assembly of the invention in contact with the surface of a flexible disk which is useful to explain the operation of the head assembly.

Referring now to FIG. 4, disk 10 is seen to comprise a standard 3 mil (3000 micro-inches) flexible record medium. The circular disk 10 comprises a flexible substrate 39 of polyethylene terephthalate or the like having thin magnetic material coating 40 to approximately 100 micro-inches on either side thereof. Located on either side of the disk 10 is a magnetic head assembly 20 in accordance with the invention. It will be noted that the protrusion 27 of each head assembly 20 penetrates the coating 40. Such penetration is possible because the magnetic coating 100 is relatively sponge like or flexible which permits such penetration. (It should, of course, be noted that, in FIG. 4, the relative dimensions of the disk 10, head assemblies 20 and the degree of penetration of the protrusion 27 into the coating 40 are not to scale and are greatly exaggerated.) As pointed out above, the height of the protrusion 27 is in the range of about 1 to about 20 micro-inches. Because of its small height, the penetration of the protrusion 27 into the coating 40 is likewise in the range of about 1 to about 20 micro-inches. Therefore, because of the low mass and light loading of the head 20 against the record medium and the slight penetration of the protrusion 27 into the record medium, there is no "dimpling" of the flexible medium as was true in the case of prior art magnetic head/coupler assemblies utilized in Bernoulli systems when coupling occurred between the head/coupler assembly and the flexible medium. Consequently, with the head assembly 20 of the present invention, it is now possible to simultaneously access both recording surfaces of the record medium 10 by two magnetic transducer elements 22 which are substantially opposed to one another as is shown in FIG. 4. Prior to the present invention, it has not been possible in Bernoulli systems to access both surfaces of the magnetic medium simultaneously when two transducers were substantially opposed to on another because of the "dimpling" of the magnetic medium which occurred when coupling was effected between the record medium and the head/coupler assembly.

It should be noted that circular disk 10 is typically 5 ¼" in diameter, however, such disks also come in other sizes, for example, 8", 3 ½" and 2".

The disk 10, as can best be seen in FIG. 1, has a recording track zone 44 defined between outer track margin 45 and inner track margin 46. The outer circumferential area 48 and inner circumferential area 50 are non-recording zones. The outer non-recording zone 48 in prior art Bernoulli systems is determined by the dimensions of the head/coupler assembly, typically 9.4mm, and the instability of the recording medium at this outer edge of the disk. Because of the small diameter of the head assembly of the present invention, approximately 2mm, read/write operation can be effected from the innermost desired track margin 46 to within approximately 1mm from the edge of the flexible media, i.e. the outer track margin can be within 1mm of the peripheral edge of the disk 10. This permits an approximate 13% increase in the area of recording track zone 44 of a standard 5 ¼" inch disk.

Figure 5:
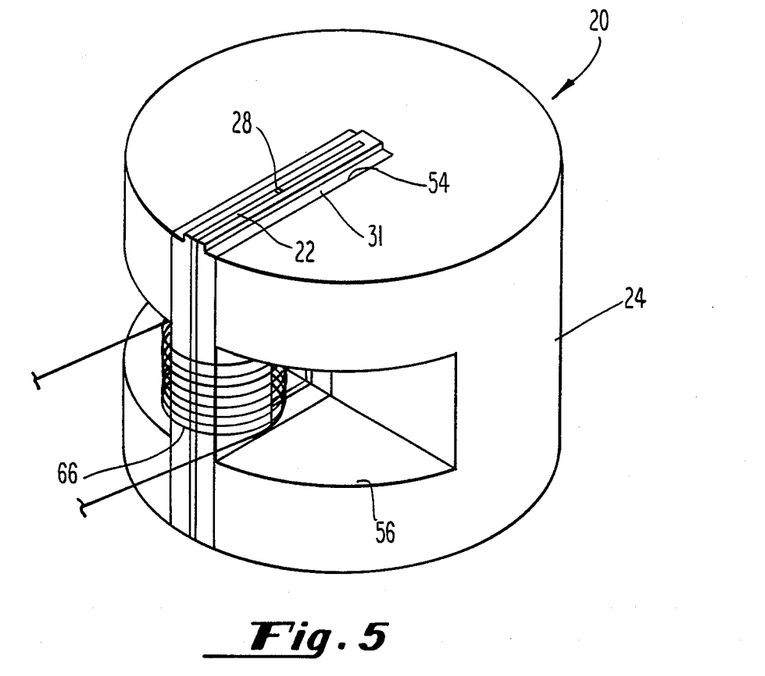
FIG. 5 is an enlarged perspective view of the magnetic head assembly of the present invention illustrating the body and transducer element thereof.

Referring now to FIG. 5, a currently preferred magnetic head assembly 20 in accordance with the invention is shown. The head assembly 20 comprises a cylindrical body 24 of solid material, such as ceramic, that has a first slot 54 parallel with the axis of the body 24. A second slot 56 is provided in the body 24 which is perpendicular to the first slot. The transducer element 22 is positioned within slot 54 and held in position within slot 54 by glassing window 31. Glassing window 31 is formed by melting glass into slot 54 after the transducer element 22 is positioned in slot 54. The transducer element 22 may be of various designs but for illustrative purposes herein comprises a ferrite member or a beveled core 58 formed of a C-bar 60 and an I-bar 62 joined together, as by glassing as is known in the art. The slot 56 and the aperture 64 formed in the core by joining of C-bar 60 and I-bar 62 provide a path for winding coil 66 on the beveled core. The abutment of the C-bar 60 and I-bar 62 form the magnetic ga 28. The uppermost portion or upper edge of the core 58 extends above the surface 26, as described above, from about 1 to about 20 micro-inches.

Applicants have found that the magnetic head assembly, in accordance with the invention, will couple to an unstable flexible record medium, i.e. a flexible record medium not first stabilized by being rotated adjacent to a Bernoulli plate, if the magnetic head assembly 20 is mounted in a flexure.

Figure 6:
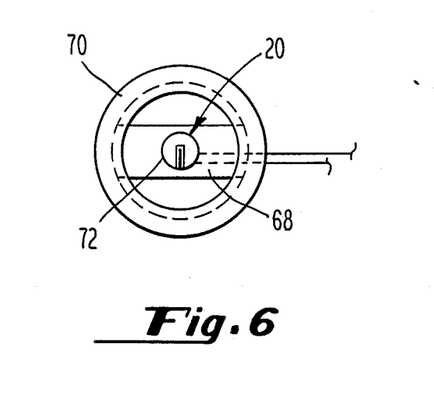
FIG. 6 is a top view of the magnetic head assembly illustrated in FIG. 5 with the head assembly being mounted in a flexure.

Referring now to FIG. 6 and 7, the head assembly 20 depicted in FIG. 5 is shown mounted in a flexure 68 and an annular flexure support member 70. The head assembly 20 is depicted as being mounted within a circular opening 72 provided in flexure 68. The head assembly 20 may be secured to flexure 68 by any suitable means, as for example, by an adhesive. The flexure 68 may be fashioned of any suitable resilient material, as for example polyethylene terephthalate (P.E.T.) film, stainless steel, etc., and its purpose is to provide a biasing force to the head assembly 20 towards the flexible record medium.

From the foregoing it will be understood to those skilled in the art that the magnetic head assembly 20 has two application modes. First, the magnetic head 20 can be rigidly mounted to an actuator arm, providing an adequate primary stabilizing mechanism is in place, such as a flexible disk spinning very near a fixed Bernoulli plate. Second, and currently the preferred mode, the magnetic head assembly 20 can be mounted on a flexure to allow the head assembly 20 to dynamically track the unstable flexible recording media. The net result of this condition provides a constant dynamic coupling between the magnetic head assembly and flexible record media to allow stable contact at the magnetic head-flexible disk interface.

Although preferred embodiments of the invention have been described and various alternatives suggested, it will be apparent to those skilled in the art that various changes and modifications may be made without departing from the spirit and scope of the invention as set forth in the appended claims.

We claim:

1. A magnetic head assembly comprising:

(a) a transducer, and
(b) a body member having a surface for disposition adjacent to a recording medium, said transducer being supported by said body member with an upper edge portion thereof protruding from said surface in the range of about 1 to about 20 micro-inches, the arrangement being such that said surface and said portion of said transducer protruding from said surface in the range of about 1 to about 20 micro-inches are effective to couple said magnetic head assembly to said recording medium by the Bernoulli effect created by movement of air between said surface and said recording medium and to effect contact between the upper edge portion of said transducer and said recording medium.

2. A magnetic head assembly according to claim 1 wherein said portion of said transducer protruding from said surface protrudes therefrom in the range of about 'to about 10 micro-inches.

3. A magnetic head assembly according to claim 1 wherein said portion of said transducer protruding from said surface protrudes therefrom in the range of about 6 to about 8 micro-inches.

4. A magnetic head assembly according to claim 1 wherein said surface has an area in the range of about 3 to about 4 square millimeters.

5. A magnetic head assembly comprising:
(a) a body member having a flat surface for disposition adjacent to a recording medium, and
(b) transducer means supported by said body member, said transducer means comprising:
(i) a core, and
(ii) a transducing coil,
said core having an upper edge protruding from said surface in the range of about 1 to about 20 micro- inches, said upper edge of said core protruding from said flat surface in the range of about 1 to about 20 micro-inches are effective to couple said magnetic head assembly to said recording medium by the Bernoulli effect created by movement of air between said flat surface and said recording medium and to effect contact between the upper edge of said transducer means and said recording medium.

6. A magnetic head assembly according to claim 5 wherein said upper edge of said core protrudes in the range of said surface from about 6 to about 8 micro-inches.

7. A magnetic head assembly comprising:
(a) a body member having a substantially flat surface for disposition adjacent to a recording medium; and
(b) transducer means supported by said body member, said transducer means having an upper edge portion protruding from said surface in the range of about 1 to about 20 micro-inches;

the arrangement being such that said flat surface and the upper edge of said transducer means protruding from said flat surface in the range of about 1 to about 20 micro-inches are effective to couple said magnetic head assembly to said recording medium by the Bernoulli effect created by movement of air between said flat surface and said recording medium and to effect contact between said upper edge of said transducer and said recording medium.

8. A magnetic head assembly according to claim 7 wherein said transducer means protrudes in the range of said surface from about 6 to about upper edge portion of said 8 micro-inches.

9. A magnetic head assembly according to claim 8 wherein said surface has an area in the range of about 3 to about 4 square millimeters.

10. A magnetic head assembly according to claim 7 wherein said transducer means comprises a plurality of transducers, each of said transducers comprising:
(a) a core member, and
(b) a coil wound on said core member said core member having a portion thereof protruding from said surface in the range of about 1 to about 20 micro-inches.

11. A magnetic head assembly according to claim 10 wherein said portion of each of said core members protruding from said surface protrudes therefrom in the range of about 6 to about 8 micro-inches.

12. A magnetic head assembly comprising:
(a) transducer means comprising:
(ii) a ferrite member, and ii) a transducing coil wound on said ferrite member, said ferrite member having an upper edge including a magnetic gap thereacross for contact with a recording medium, and
(b) a body member having a flat surface for disposition adjacent to said recording medium, said transducer means being supported by said body member with said upper edge of said ferrite member protruding from said substantially flat surface in the range of about 1 to about 20 micro-inches, the arrangement being such that said flat surface and said upper edge of said ferrite member protruding from said flat surface about in the range of 1 to about 20 micro-inches are effective to couple said magnetic head assembly to a rotating recording medium by the Bernoulli effect created by movement of air between said flat surface and the rotating record medium and to effect contact between the upper edge of said ferrite member and the rotating recording medium.

13. A magnetic head assembly according to claim 12 wherein said upper edge of said ferrite member protrudes from said surface in the range of about 6 to about 8 micro-inches.

14. A magnetic head assembly according to claim 12 wherein said surface has an area in the range of about 3 to about 4 square 15. A magnetic head assembly comprising:
(a) a cylindrical body having an upper flat surface for disposition adjacent to a recording medium and having a slot parallel with the axis of said body; and
(b) a transducer element positioned within said slot, said transducer element comprising:
(i) a ferrite member, and
(ii) a transducing coil wound on said ferrite member, said ferrite member having an upper edge including a magnetic gap thereacross;
the upper edge of said ferrite member protruding from said upper flat surface of said cylindrical body from about 1 to about 20 microinches.

16. A magnetic head assembly according to claim 15 wherein said upper flat surface of said cylindrical body has an area in the range of about 3 to about 4 square millimeters.

17. A magnetic head assembly according to claim 15 wherein said upper edge of said ferrite member protrudes from said upper flat surface of said cylindrical in the range of about 6 to about 8 micro-inches.

18. A magnetic head assembly according to claim 17 wherein said cylindrical body has a second slot perpendicular to said slot and wherein said ferrite member has an aperture therethrough, said second slot and said aperture providing a path for winding said transducing coil on said ferrite member.

* * * * *

UNITED STATES PATENT AND TRADEMARK OFFICE
CERTIFICATE OF CORRECTION

PATENT NO. : 4,975,794

DATED : December 4, 1990

INVENTOR(S) : Losee et al.

It is certified that error appears in the above-identified patent and that said Letters Patent is hereby corrected as shown below:

Column 5, Line 44 - "3" should be typed as "32".

Column 5, Line 54 - after the word "Also" a slash "/" appears. A comma "," should appear instead.

Column 8, Line 25 - "ga" should be typed as "gap".

Column 9, Line 19 - the apostrophe "'" should be the number three "3".

Claim 8 should read as follows:

8. A magnetic head assembly according to claim 7 wherein said upper edge portion of said transducer means protrudes from said surface in the range of about 6 to about 8 micro-inches. (The underlined portions need to be in this claim.)

Claim 17, Line 3 - after "cylindrical" the word "body" should appear.

Signed and Sealed this

Thirteenth Day of October, 1992

*Attest:*

DOUGLAS B. COMER

*Attesting Officer*     *Acting Commissioner of Patents and Trademarks*

UNITED STATES PATENT AND TRADEMARK OFFICE
CERTIFICATE OF CORRECTION

PATENT NO. : 4,975,794

DATED : December 4, 1990

INVENTOR(S) : Losee et al.

It is certified that error appears in the above-identified patent and that said Letters Patent is hereby corrected as shown below:

Column 9, Lines 44-47 - Claim 6 should read as follows:

6.  A magnetic head assembly according to claim 5 wherein said upper edge of said core protrudes _from said surface_ in the range of about 6 to about 8 micro-inches.

Signed and Sealed this

Second Day of March, 1993

Attest:

STEPHEN G. KUNIN

*Attesting Officer*     Acting Commissioner of Patents and Trademarks